INVENTOR.
RALPH H. FREEVOL
BY *M. A. Hobbs*
ATTORNEY

Sept. 10, 1963 R. H. FREEVOL 3,103,392
FAN CONSTRUCTION
Filed Sept. 7, 1961 3 Sheets-Sheet 2
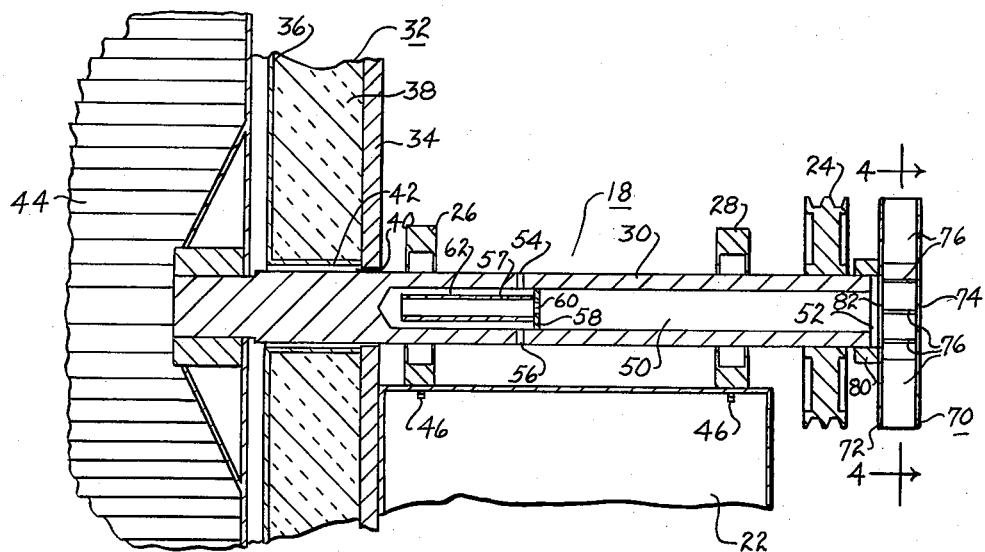
FIG. 3
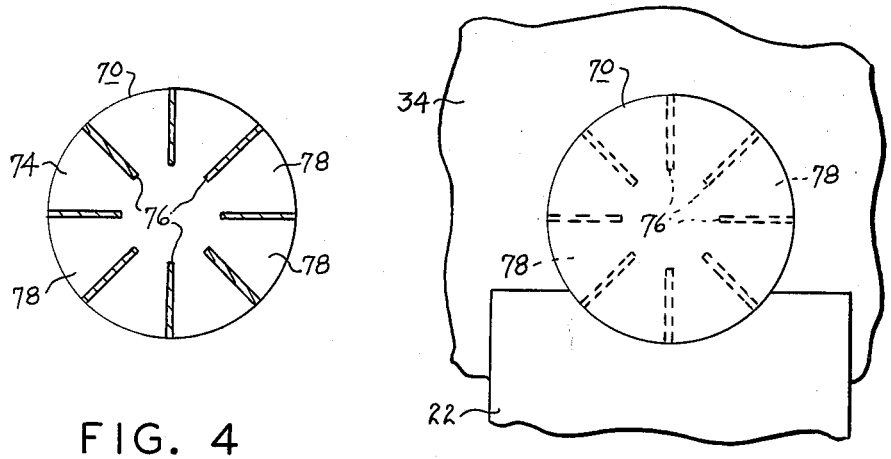
FIG. 4
FIG. 5
INVENTOR.
RALPH H. FREEVOL
BY
M. A. Hobbs
ATTORNEY Sept. 10, 1963 R. H. FREEVOL 3,103,392
FAN CONSTRUCTION
Filed Sept. 7, 1961 3 Sheets-Sheet 3

INVENTOR.
RALPH H. FREEVOL
BY
ATTORNEY

United States Patent Office 3,103,392
Patented Sept. 10, 1963

3,103,392
FAN CONSTRUCTION
Ralph H. Freevol, Niles, Mich., assignor to Garden City Fan & Blower Co., Niles, Mich., a corporation of Illinois
Filed Sept. 7, 1961, Ser. No. 136,514
9 Claims. (Cl. 308—77)

The present invention relates to a fan or blower construction and more particularly to the drive mechanism for a power driven fan or blower.

Fans and blowers are frequently required to operate in areas of relatively high temperatures, or to handle heated air or other gases often over long periods of time and at relatively high speeds. These operating conditions place a particular strain on the drive shaft and bearings, causing excess wear and shortened life of one or both of these parts. Various methods and means have been proposed for overcoming this difficulty, including incorporating in the fan or blower structure a means for cooling the shaft and/or bearings, but these means have generally been bulky and cumbersome and interfered with the installation and maintenance of the fan or blower equipment, and have been inefficient and expensive and added little to the operational efficiency of the fan or blower equipment. Further, those incorporated in the drive shaft or bearings have in the past resulted in a weaker and less dependable construction which often required frequent service and occasional repair and replacement. It is therefore one of the principal objects of the present invention to provide a power drive mechanism for a fan or blower having a main shaft and bearings, in which a cooling mechanism or system is incorporated without increasing the overall size of the equipment or mechanism and without causing any appreciable weakening of the shaft or bearings.

Another object of the invention is to provide a cooling system or mechanism for a shaft journalled in a pair of bearings which can readily be incorporated in the shaft without appreciably weakening the shaft, and which provides maximum cooling effect utilizing the flow of air through the portion of the shaft in the bearing to perform the cooling function.

Still another object of the invention is to provide a means for cooling the shaft and bearings of a drive for a fan or blower which, with the exception of a compact impeller device at the end of the shaft, is fully contained in the shaft and is operated by the rotation of the shaft while the fan or blower is being driven thereby, and which is so constructed and designed that the shaft can be used efficiently either with or without the cooling means.

A further object is to provide a relatively simple and compact mechanism of the aforesaid type which contains no moving parts other than those moving in unison with the shaft, and which requires little or no service or other attention to maintain the mechanism in optimum operating condition.

Another object of the invention is to provide a cooling means for a rotatable shaft journalled in a plurality of spaced bearings, in which air is drawn from the space between the bearings into a longitudinally disposed passage and passed through the portion of the shaft journalled in the bearing and discharged at or adjacent the end of the shaft, and which is so constructed that the shaft containing the means is readily interchangeable with a conventional shaft.

Additional objects and advantages of the present invention will become apparent from the following description and accompanying drawings, wherein:

FIGURE 3 is a fragmentary vertical cross sectional view of the fan shown in FIGURES 1 and 2;

FIGURE 4 is a cross sectional view of the mechanism shown in FIGURE 3, taken on line 4—4 of the latter figure;

FIGURE 5 is an end elevational view of the mechanism shown in FIGURE 3;

Figure 1:
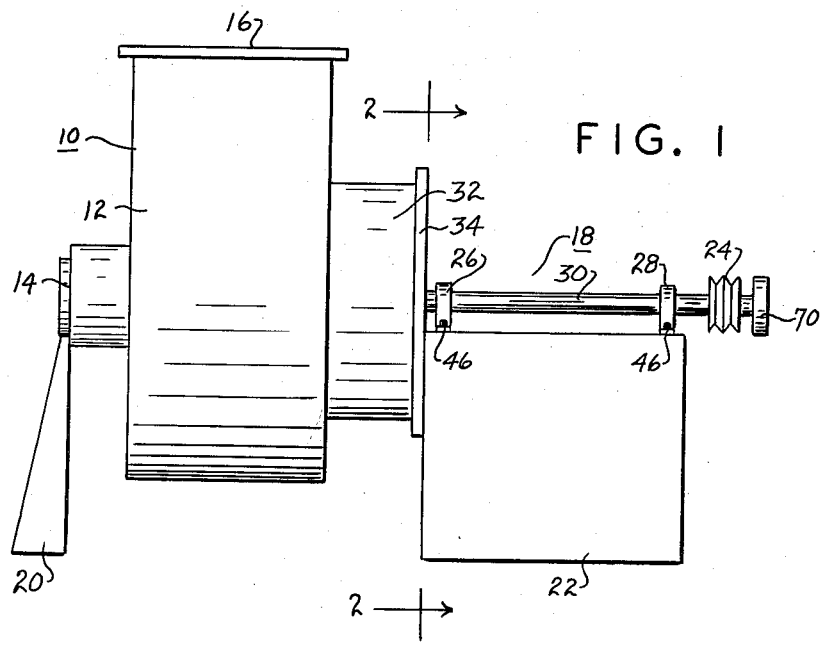
FIGURE 1 is a side elevational view of a fan or blower embodying the present invention.
Figure 2:
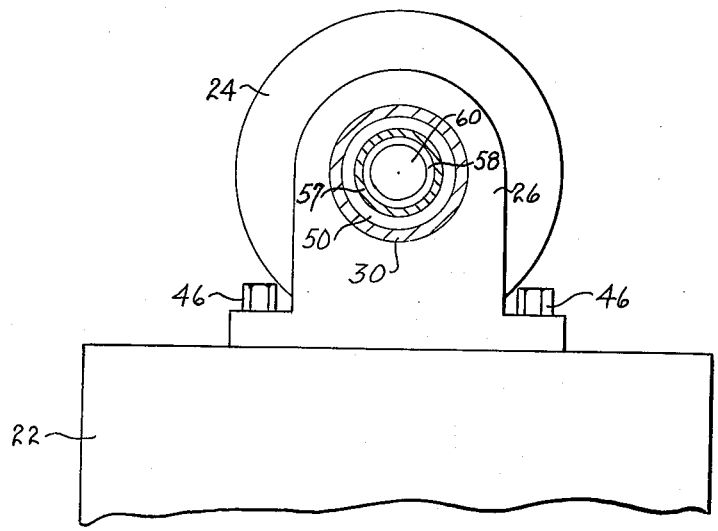
FIGURE 2 is a vertical longitudinal cross sectional view through the fan shown in FIGURE 1, taken on line 2—2 of that figure.
Figure 6:
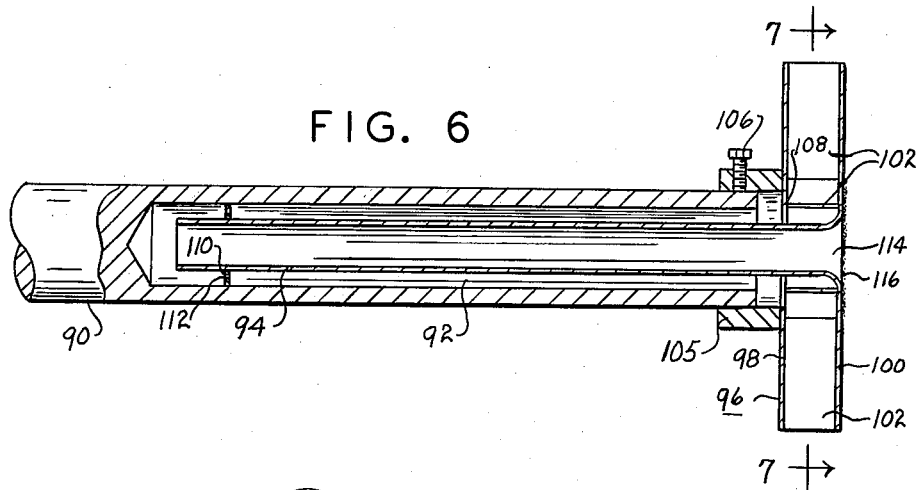
FIGURE 6 is a fragmentary cross sectional view of a modified form of the present invention, the section being taken corresponding to that of FIGURE 3.
Figure 9:
FIGURE 9 is an elevational view of a tube support used in the embodiment shown in FIGURES 6 through 8.
Figure 7:
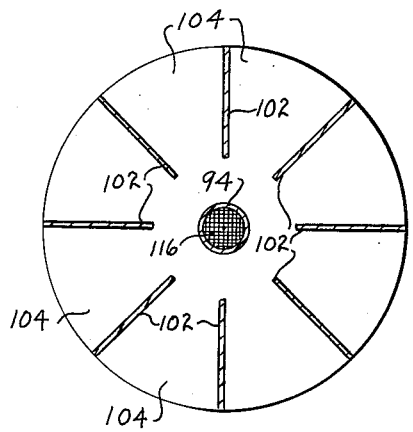
FIGURE 7 is a vertical cross sectional view, taken on line 7—7 of FIGURE 6.
Figure 8:
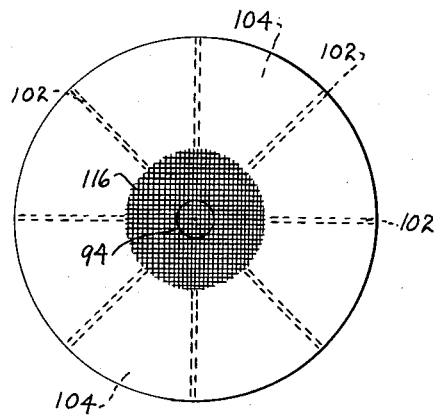
FIGURE 8 is an end elevational view of the mechanism shown in FIGURE 6.

Referring more specifically to the drawings and to FIGURES 1 and 2 in particular, numeral 10 designates generally a fan or blower designed for handling air at relatively high temperatures and to operate in warm or hot areas for extended periods of time, the unit consisting of a housing 12 having an air inlet 14, an air outlet 16, drive mechanism 18 and supports 20 and 22 for the fan and drive mechanism. When the unit 10 has been installed, an intake conduit may be connected to air inlet 14, and a discharge conduit may be connected to air outlet 16, and a motor (not shown) is connected by a plurality of V-belts to a sheave 24 of the drive mechanism. The fan or blower shown in the drawings is intended merely as an illustration of the type of equipment to which the present invention is particularly applicable, since a fan or blower of this type is often required to operate under high temperatures for long periods of time. This places a substantial burden on the bearings which on conventional equipment often results in their failure and frequent replacement thereof. The drive mechanism 18, including bearings 26 and 28 and shaft 30, is partially shielded from the high temperature of gases passing through housing 12 by an insulating ring 32 consisting of an external wall 34, an internal wall 36 and insulating material 38 filling the space between walls 34 and 36. A hole 40 defined by a sleeve 42 provides an opening through which shaft 30 passes into the internal passage of housing 12 for driving a blower 44, for example, mounted on the end of the shaft. Bearings 26 and 28 are bolted onto the upper side of bearing support 22 by a plurality of bolts 46 extending downwardly through the base of the bearings and through the upper plate of the bearing base. The bearings 26 and 28 may be of any suitable types of well known construction, such as ball, roller or babbitt bearings, and the detail construction of the bearings does not form any direct part of the present invention.

In the embodiment of the invention disclosed in FIGURES 3, 4 and 5, the main drive shaft 30 contains a longitudinal passage 50 extending inwardly from the free end 52 thereof to a point beyond the second bearing 26 and adjacent to the external wall 34 of insulating structure 32. The hole is preferably sufficiently large, i.e. the thickness of the wall defining the hole is preferably as thin as possible consistent with adequate strength, so that efficient cooling is obtained throughout the operation of the mechanism. Passage 50 is connected with ambient air by a plurality of ports 54 and 56 extending through the wall defining passage 50 and being disposed between bearings 26 and 28. In order to direct the air through both bearings, a longitudinally axially disposed tube 57 is mounted in the end of passage 50 adjacent the closed end thereof and supported by a partition 58 having a hole 60 therethrough communicating with one end of tube 57, the discharge end of said tube being adjacent the end of passage 50. It is seen that air may now flow through ports 54 and 56 to annular space 62 between the tube and the wall defining passage 50 on the left-hand side of partition 58, as viewed in FIGURE 3, along the internal wall of passage 50 and thence through the tube into the section of the shaft passage to the right of partition 58, and thence to the end 52 of the shaft. The air flowing through this circuitous path comes in contact with the wall of passage 50, first within bearing 26, and thence in contact with the wall of passage 50 within bearing 28, thus cooling the shaft in the portions thereof supported by the bearing. This maintains the shaft and bearings sufficiently cool to maintain them in proper operating condition for extended periods of time.

The flow of air through ports 54 and 56 and passage 50 is created and maintained by an impeller 70, or other suitable air flow creating means, mounted on or attached to end 52 of shaft 30. The impeller shown consists of two spaced discs 72 and 74 between which are mounted eight radially disposed blades 76 joined integrally to the internal surfaces of discs 72 and 74, and forming radial flow air passages 78. This integral unit is joined to a sleeve 80, which in turn is mounted onto end 52 of shaft 30 by screw threads, or any other suitable securing means. With the impeller mounted on the end of shaft 30, air thence flows from passage 50 into intake port 82 of the impeller and radially outwardly through passages 78, being discharged from the impeller at the periphery thereof. The impeller may be modified in various ways to increase its efficiency or to make it more compact, if desired.

In the operation of the foregoing shaft cooling mechanism, as the shaft is rotated by the motor through sheave 24, the impeller 70 creates a suction at intake port 82 and in passage 50, which in turn causes air to flow through ports 54 and 56 between the two bearings, thence through space 62, through tube 57 and passage 60 into the impeller from which it is discharged at the periphery. It is thus seen that the air passes substantially the full length of the shaft or the portion of the shaft extending beyond the main body of the blower, thus, giving a substantial cooling effect to the principal operating portion of the shaft. It is further seen that the shaft cooling mechanism contains no parts movable independently of the shaft, and the mechanism utilizes only space not otherwise required for compact, efficient installations.

In the modification shown in FIGURES 6 through 9, the shaft 90 which is journalled in bearings similar to bearings 26 and 28, and which supports the blower 44 in a manner similar to that shown in FIGURES 2 and 3, contains a longitudinal passage 92 passing through the shaft, including the portions journalled in the two bearings. In this modified form, the air, instead of being admitted into the internal passage by radially extending holes through the shaft sidewall, is admitted through a central tube 94, extending substantially the full length of passage 92 and being open at its right-hand end as viewed in FIGURE 6 at the end of the shaft, and being open at the left-hand end at the closed end of passage 92. The flow of air is created through passage 92 and tube 84 by an impeller 96 similar in construction and operation to impeller 70, consisting of two spaced discs 98 and 100 between which are disposed a plurality of radially extending blades 102 forming radial passages 104. The impeller is mounted on the free end of shaft 90 by a sleeve 105 joined integrally to the external surface of disc 98 and to the end of the shaft by one or more set screws 106, the intake port 108 of the impeller connected directly with the end of passage 92. Tube 94 is supported at the right-hand end by disc 100 of the impeller and at the left-hand end by a spacer 110 having a plurality of holes 112 therein to permit air to flow freely through passage 92 externally of tube 94. The intake end 114 of tube 94 preferably contains a screen or other type of filtering means 116 across the end thereof.

It is seen that in the operation of shaft 90, impeller 96 rotates, causing a suction to be created at port 108, and thereby creating a flow of air inwardly from inlet end 114 through tube 94 into passage 92 externally of the tube, through ports 112, and thence to the impeller from which it is discharged through passages 104 at the periphery of the impeller. The type of construction shown in this modified form permits a controlled supply of cool air to be constantly admitted into the passages cooling the shaft. It is seen that the air passes along the wall defining passage 92 throughout a substantial portion of the shaft, particularly within the portion journalled in the two bearings, thus providing adequate cooling to maintain the shaft and bearings in proper operating condition for long periods of time.

While only two forms of the present invention have been described in detail herein, various changes and modifications may be made without departing from the scope of the invention.

I claim:

1. In a fan or blower construction for use under relatively high temperature conditions: a rotatable shaft, a pair of spaced bearings for said shaft, a sheave for rotating said shaft in said bearings, said shaft having a passage extending longitudinally therein from one end thereof and through the portion of said shaft journalled in said bearings and being closed at the other end, and a plurality of ports connecting said passage with ambient air between said bearings, a partition in said passage disposed between said ports and said one end of the shaft and having a hole therethrough, a tube connected to said partition at said hole and extending longitudinally in said passage in the direction opposite from said one end of the shaft and terminating adjacent the closed end of said passage, and an impeller mounted rigidly on said shaft at said one end and communicating at its intake opening with said passage.

2. In a fan or blower construction for use under relatively high temperature conditions: a rotatable shaft, a means for driving said shaft, bearings for said shaft, said shaft having a passage extending longitudinally therein from one end thereof and through the portion of said shaft journalled in said bearings and being closed at the other end, and a port in the wall of said shaft between said bearings, a partition in said passage disposed between said port and said one end of the shaft and having a hole therethrough, a tube connected to said partition at said hole and extending longitudinally in said passage in the direction opposite from said one end of the shaft and terminating adjacent the closed end of said passage, and an impeller mounted rigidly on said shaft at said one end and communicating at its intake opening with said passage.

3. A power drive for use under relatively high temperature conditions, comprising a shaft, a pair of spaced bearings for said shaft, said shaft having a passage extending longitudinally therein from one end thereof and through the portion of said shaft journalled in said bearings and being closed at the other end, and a port in the wall of said shaft between said bearings, a partition in said passage disposed between said port and said one end of the shaft and having a hole therethrough, a tube connected to said partition at said hole and extending longitudinally in said passage in the direction opposite from said one end of the shaft and terminating adjacent the closed end of said passage, and an impeller mounted rigidly on said shaft at said one end and communicating at its intake opening with said passage.

4. A power drive mechanism comprising a rotatable shaft, a bearing for said shaft, a means for rotating said shaft in said bearing, said shaft having a passage extending longitudinally therein from one end thereof and through the portion of said shaft journalled in said bearing and being closed at the other end, a port in the side wall of said shaft communicating with said passage, a partition in said passage disposed between said port and said one end of the shaft and having a hole therethrough, a tube connected to said partition at said hole and extending longitudinally in said passage in the direction opposite from said one end of the shaft and terminating adjacent the closed end of said passage, and an impeller mounted rigidly on said shaft at said one end and communicating at its intake opening with said passage.

5. A power drive mechanism comprising a rotatable shaft, a bearing for said shaft, said shaft having a passage extending longitudinally therein from one end thereof and through the portion of said shaft journalled in said bearing and being closed at the other end, a port in the side wall of said shaft communicating with said passage, a partition in said passage disposed between said port and said one end of the shaft and having a hole therethrough, a tube connected to said partition at said hole and extending longitudinally in said passage in the direction opposite from said one end of the shaft and terminating adjacent the closed end of said passage, and an air flow creating means communicating with said passage to create a flow therethrough.

6. A power drive mechanism comprising a shaft, a bearing for said shaft, said shaft having a passage extending longitudinally therein from one end thereof and through the portion of said shaft journalled in said bearing and being closed at the other end, a tube extending longitudinally in said passage in the direction opposite from said one end of the shaft and terminating adjacent the closed end of said passage, a structure spaced from the inner end of said tube and extending across said passage for supporting said tube in said shaft, and an impeller mounted rigidly on said shaft at said one end and communicating at its intake opening with said passage.

7. A power drive mechanism comprising a rotatable shaft, a pair of spaced bearings for said shaft, a sheave for rotating said shaft in said bearings, said shaft having a passage extending longitudinally therein from one end thereof and through the portion of said shaft journalled in said bearings and being closed at the other end, an impeller mounted rigidly on said shaft at said one end and communicating at its intake opening with said passage, a tube supported by said shaft and extending inwardly through said impeller and longitudinally in said passage and terminating adjacent the closed end of said passage, a perforated spacer on said tube for supporting said tube in said shaft and retaining said tube in axial alignment in said passage, and a screen-like member across the end of said tube at said impeller.

8. A power drive mechanism, comprising a rotatable shaft, a pair of spaced bearings for said shaft, a means for rotating said shaft in said bearings, said shaft having a passage extending longitudinally therein from one end thereof and through the portion of said shaft journalled in said bearings and being closed at the other end, an impeller mounted rigidly on said shaft at said one end and communicating at its intake opening with said passage, and a tube supported by said shaft and extending inwardly through said impeller and longitudinally in said passage and terminating adjacent the closed end of said passage.

9. A power drive mechanism, comprising a shaft, a bearing for said shaft, said shaft having a passage extending longitudinally therein from one end thereof and through the portion of said shaft journalled in said bearing and being closed at the other end, an impeller mounted rigidly on said shaft at said one end and communicating at its intake opening with said passage, and a tube supported by said shaft and extending inwardly through said impeller and longitudinally in said passage and terminating adjacent the closed end of said passage.

References Cited in the file of this patent
UNITED STATES PATENTS

| | | |
|---|---|---|
| 290,159 | Wilkin | Dec. 11, 1883 |
| 2,395,097 | Buck et al. | Feb. 19, 1946 |
| 2,549,171 | Clayton | Apr. 17, 1951 |
| 2,751,210 | Ludwig | June 19, 1956 |
| 2,789,021 | Pedersen | Apr. 16, 1957 |